Patented Sept. 8, 1936

2,053,530

UNITED STATES PATENT OFFICE 2,053,530

ART OF COMPOUNDING RUBBER

Royce J. Noble, Malden, Mass., assignor to Heveatex Corporation, Melrose, Mass., a corporation of Massachusetts No Drawing. Application June 27, 1934, Serial No. 732,663

3 Claims. (Cl. 106—23)

This invention relates to the art of compounding rubber, being more particularly concerned with the working of one or more rubber-compounding agents into a batch of solid rubber as it is being masticated or milled as ordinarily in any one of the usual compounding or mixing mills. A primary object of the invention is to effect a substantially uniform dissemination of one or more rubber-compounding agents throughout a rubber batch in a short period of time and with low power consumption. While not limited thereto, I shall discuss the utility of my invention as applied more especially to the introduction into the rubber batch of pigments, dyes, or similar compounding agents that are designed to produce a colored rubber compound.

It is well known that the incorporation of pigments, dyes, or similar coloring agents into a rubber batch as it is being milled results in a substantially uniformly colored rubber compound only after a long milling period and the expenditure of much power. This is attributable to the fact that the coloring agent has comparatively little affinity for the rubber and hence does not work readily into and throughout the batch. Attempt has been made to overcome this difficulty by adding the coloring agent to rubber latex, coagulating the latex, and mixing the resulting substantially uniformly colored rubber coagulum with the batch of solid rubber that is to be colored in the rubber mill. Such a mixing operation is, however, also difficult to perform, as the colored rubber coagulum must be attenuated in a body, namely, a batch of solid rubber, that is highly resistant to such attenuation.

In accordance with the present invention, I work a rubber-compounding agent into a rubber batch as it is being milled by adding such agent to the rubber batch in the form of rubber-enveloped or rubber-wet particles, such agent preferably being affixed to or combined with particles of powdered rubber, as I have found that by virtue of the fine particle size of the powdered rubber and its affinity for the rubber batch it works readily into and throughout the batch and thus serves to carry the compounding agent into and throughout the batch. The present invention may be practiced with rubber-wet particles of rubber-compounding agent prepared in any suitable way. Thus, I may to advantage employ the method disclosed in my application Serial No. 706,858, filed January 16, 1934, in preparing a powdered rubber with which the desired rubber-compounding agent is intimately and uniformly associated, the agent being embedded in the particles of powdered rubber so as to be enveloped or wet by the rubber. A colored, powdered rubber may be prepared in accordance with the method of that application by the following procedure.

About 60 pounds of a 10% casein solution is added, with stirring, to about 250 pounds of ammonia-preserved latex of 40% solids content. An aqueous suspension of coloring matter, such as so-called Victoria blue, the particles of which are of colloidal fineness, is then added in desired amount to the latex-casein mixture. The resulting colored mixture may, if desired, be diluted with water to a solids content of about 20%. The mixture is then treated while being stirred with a solution prepared by dissolving 5 pounds of zinc chloride and about 1 ounce of acetic acid in about 200 to 500 pounds of water. The mixture thus treated may have a pH value of approximately 8. It gradually thickens and its solids content is finally resolved into a slurry of rubber flocs with which the dyestuff is substantially uniformly combined, particles of dyestuff being uniformly distributed throughout and embedded in each rubber floc. The slurry of dyed rubber flocs is then dewatered, as in a filter press, until a cake of about 60% to 70% solids content is had. This cake is characterized by its tendency to crumble readily into powder upon merely being rubbed between the fingers. Upon removal from the filter press, it is preferably dusted with talc, zinc stearate, or other suitable dust and passed through a suitable machine such as an Abbe rotary cutter, that reduces it to the desired particle size, for instance, into a powder of about 50 or finer mesh. The powder is then brought to substantial dryness, there being little, if any, tendency for the discrete particles to cohere particularly in the presence of the dusting agent.

The substantially dry, powdered rubber, all of whose particles are substantially uniformly dyed, can be readily worked in the desired amount into a rubber batch as it is being milled, the dyed rubber particles tending to disperse uniformly throughout the bath and to color it substantially uniformly. Not only does the practice of my invention make possible increased capacity in a rubber mill and a saving of power, but it enables the realization of maximum coloring effect in the resulting rubber compound through the use of a given amount of coloring agent.

The principles of the present invention apply to the compounding with rubber of other than coloring agents, for instance, vulcanizing agents, accelerators of vulcanization, anti-oxidants, etc., all of which have heretofore presented to a greater or less degree the same compounding difficulties as have been experienced with coloring agents. Any one or a mixture of these agents may be affixed to the particles of powdered rubber, for instance, as disclosed in my application Serial No. 706,858, and then worked into a rubber batch as it is being milled. The powdered rubber thus serves as a vehicle for carrying these agents into a batch of rubber and constitutes, in effect, a master batch which contains predetermined amounts of the compounding agents. It is thus possible to weight out portions of the master batch containing known amounts of the compounding agents, which are introduced into a given rubber batch with a minimum amount of milling and with a greatly reduced risk of damage, such as scorching, to the resulting rubber compound. An additional advantage residing in the use of such a master batch is that mistakes resulting from incorrect weighing of powerful accelerators of vulcanization are minimized.

For the purpose of my invention, the most expedient and economical way of producing a discontinuous, preferably pulverulent, mass of rubber, each particle of which contains embedded therein a uniform amount of rubber-compounding agent, is to add the rubber-compounding agent to water-dispersed rubber, such as natural or artificial rubber latex, and then to recover the solids content of the latex in the desired state of discontinuity or fine particle size. So far as concerns the recovery of the solids content of the rubber latex in the desired state of discontinuity, practices other than that disclosed in my application Serial No. 706,858 may be employed. Thus, the latex compounded with the desired amount of color powder or other rubber-compounding agent, may be sprayed onto a moving hot surface so as to produce myriad compounded rubber particles all of which carry the compounding agent substantially uniformly distributed therethrough. These compounded rubber particles may be scraped or otherwise removed from the hot surface to produce a pulverulent or granulated mass that is added in accordance with my invention to a rubber batch as it is being milled, the result being that the rubber component of the discontinuous or pulverulent mass serves as a vehicle to carry the compounding agent combined therewith into and throughout the rubber batch. I do not, however, herein claim per se any particular practice of producing such a discontinuous or pulverulent rubber mass compounded with the desired agent, as this constitutes no part of the present invention.

I claim:—

1. In the art of working a rubber-compounding agent into a rubber batch as it is being milled, the practice which comprises compounding said agent in finely divided form with water-dispersed rubber of the nature of rubber latex, flocculating said rubber dispersion to produce rubber flocs in which said agent is embedded, dewatering said rubber flocs to cake form while still retaining therein sufficient moisture to preserve a crumbly condition therein, mechanically reducing the moist cake to powder of about 50 or finer mesh particle size, drying the powder, and adding the resulting dry powder to the rubber batch being milled, whereby the rubber component of said powder serves to carry said agent embedded therein into and throughout said batch.

2. In the art of working a rubber-compounding agent into a rubber batch as it is being milled, the practice which comprises compounding said agent in finely divided form with water-dispersed rubber of the nature of rubber latex, flocculating said rubber dispersion to produce rubber flocs in which said agent is embedded, dewatering the rubber flocs to produce a cake having a solids content not greater than about 60% to 70%, mechanically reducing the moist cake to powder of about 50 or finer mesh particle size, drying the powder, and adding the resulting dry powder to the rubber batch being milled, whereby the rubber component of said powder serves to carry said agent embedded therein into and throughout said batch.

3. In the art of working a coloring or pigmenting agent into a rubber batch as it is being milled, the practice which comprises compounding said agent in finely divided form with water-dispersed rubber of the nature of rubber latex, flocculating said rubber dispersion to produce rubber flocs in which said agent is embedded, dewatering said rubber flocs to produce a cake having a solids content not greater than about 60% to 70%, mechanically reducing the moist cake to powder of about 50 or finer mesh particle size, drying the powder, and adding the resulting dry powder to the rubber batch being milled, whereby the rubber component of said powder serves to carry said agent embedded therein into and throughout said batch and thus to color or pigment said batch substantially uniformly.

ROYCE J. NOBLE.